3,177,249
N-TRIFLUOROMETHYLPHENYL UREA

Henry Martin, Basel, and Hans Aebi, Riehen, Switzerland, assignors to Ciba Limited, Basel, Switzerland, a company of Switzerland
No Drawing. Filed Aug. 1, 1960, Ser. No. 46,346
Claims priority, application Switzerland, Aug. 21, 1959, 77,208
10 Claims. (Cl. 260—552)

Herbicidal substances that contain trifluoromethyl groups have been made in various ways. Thompson et al. describe, for example, among the numerous compounds developed on behalf of the Chemical Warfare Service (Bot. Gas. (1946), vol. 107, pages 476 to 507) four substances which contain trifluoromethyl groups, the action of some of which lies far below that of the known phenoxyacetic acids. In "Weeds," vol. 2, 1953, page 58, the herbicidal action of isopropyl-N(3-trifluoro-methyl-phenyl)-carbamate is referred to, and is about three times less than that of isopropyl-N-3-(chlorophenyl)-carbamate (CIPC). Al. Abel described in "Chemistry and Industry" (1957), at page 1106, in connection with Hill's reaction the action of N-(4-trifluoromethyl - phenyl) - N':N'-dimethyl-urea and N-(3-trifluoromethyl-phenyl)-N':N'-dimethyl-urea. Owing to the excessively high cost of manufacture of these compounds and their low inhibiting value on the photolysis of water that is vital in the carbon metabolism of plants they have not found practical importance. None of the numerous N-aryl-N':N'-dialkyl-ureas developed for herbicidal purposes describes or even claims active substances containing a trifluoro-methyl group. Tests made by the inventors upon N-(3:5-bis-trifluoromethyl-phenyl)N':N'-dimethyl-urea show that this compound possesses no useful activity. The known N':N'-diaryl-ureas containing trifluoromethyl groups (see Swiss specification No. 315,319, patented May 6, 1953, by Dr. Henry Martin, Zurich, Switzerland, and Austrian specification No. 185,814, patented September 15, 1955, by J. R. Geigy A.G., Basel, Switzerland), possess only an insecticidal action against insects that feed on keratin.

The present invention is based on the unexpected observation that N-phenyl-N'-alkyl-ureas which contain a trifluoromethyl group and are halogen-substituted in the phenyl nucleus and correspond to the general formula

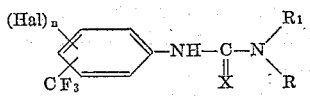

in which R represents a lower alkyl group, $R_1$ represents a hydrogen atom or a lower alkyl group, X represents an oxygen or sulfur atom, and $n$ is the whole number 1 or 2, possess an excellent herbicidal action.

Among the compounds of the above formula there may be especially those of the general formula

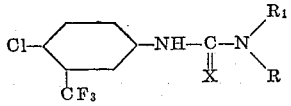

in which X, R and $R_1$ have the meanings given above. Among the compounds of the latter formula there are preferred those in which X represents an oxygen atom, and among these compounds those in which R represents a methyl or ethyl group and $R_1$ a hydrogen atom, or methyl or ethyl group.

The compounds of the above general formulae can be made by the application of known general methods, all the customary methods for making derivatives of urea or thiourea being generally suitable. There are indicated below a few methods, but these are not to be regarded as exhaustive; (the halogen-substituted phenyl radical containing a trifluoromethyl group is denoted by the symbol Ar and R and $R_1$ in the formulae below represent methyl groups)

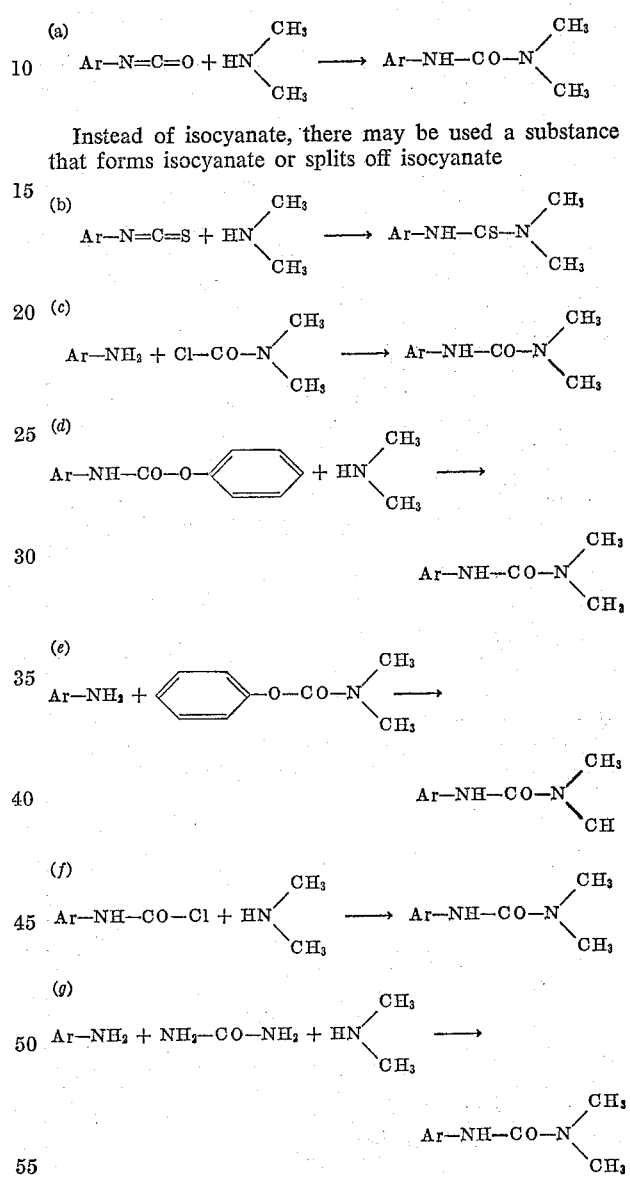

Instead of isocyanate, there may be used a substance that forms isocyanate or splits off isocyanate As arylamines for use in making compounds of the invention there may be mentioned, for example, 3-trifluoromethyl-4-chloraniline,
2-chloro-5-trifluoromethylaniline,
2-trifluoromethyl-4-chloraniline,
2:5-dichloro-4-trifluoromethylaniline,
3-trifluoromethyl-4-bromanline and the like.

As aliphatic amines which may be reacted with the aromatic isocyanates, there may be mentioned, for example, monomethylamine, monoethylamine, dimethylamine, methyl-ethylamine, methyl-propylamine, methyl-butylamines, and diethylamine.

Among the numerous compounds of the invention there may be mentioned, for example, N-3-trifluoromethyl-4-chlorophenyl-N':N'-dimethyl-urea, N-3-trifluoromethyl-4-chlorophenyl-N'-methyl-N'-n-butyl-urea, N-3-trifluoromethyl-4-chlorophenyl-N'-methyl-urea and N-2:5-dichloro-4-trifluoromethylphenyl-N':N'-dimethyl-urea.

For use the compounds of the invention are advantageously made up into preparations, which are also included in the invention. The active substance may be used in emulsified, dispersed or dissolved form or in the form of dusting preparations.

The compounds may be used alone or together with other herbicidal substances, for example, tri- or tetra-substituted aryl-alkyl-ureas, halogenated phenoxy-alkane carboxylic acids, halogenated benzoic acids or phenyl-acetic acids or halogenated fatty acids, or salts, esters or amides of these acids, or with borax or other inorganic salts, such as abraum salts, calcium cyanamide, urea or other fertilizers, or pest combating agents, for example, chlorinated hydrocarbons or phosphoric acid esters. Alternatively, active substances of basic reaction, such as tertiary or quaternary amines having herbicidal properties may be incorporated in the preparations, for example, dodecylhexamethyleneimine or salts thereof, or 1:1'-ethylene-2:2'-dipyridinium dibromide. Carbamates or thiol-carbamates, dithiocarbamic acid esters or derivatives or symmetrical triazine possessing herbicidal properties may also be incorporated in the preparations. There may be added heterocyclic compounds having a herbicidal action, for example, 2-chloro-benzthiazole, 3-amino-1:2:4-triazole, maleic acid hydrazide, 3:5-dimethyl-tetrahydro-1:3:5:2:4-thiadiazine-2-thione, but there may also be used simpler herbicidal substances, such as pentachlorophenol, dinitro-cresol, dinitro-butyl-phenol, naphthyl-phthalamic acid or methyl-isothiocyanate.

For making solutions to be used for direct spraying there may be used, for example, mineral oil fractions of high to medium boiling range, such as diesel oil or kerosene, or coal tar oils or oils of vegetable or animal origin and also hydrocarbons, such as alkylated naphthalenes, tetrahydronaphthalene, if desired, with the use of mixtures of xylenes, cyclohexanols, ketones, also chlorinated hydrocarbons, such as tetrachlorethane, trichlorethylene or tri- or tetrachloro-benzenes.

Aqueous preparations for direct use can be prepared by mixing water with an emulsion, concentrate, paste or wettable powder containing the active substance. As emulsifying or dispersing agents there may be used non-ionic substances, for example, condensation products of aliphatic alcohols, amines or carboxylic acids having long-chain hydrocarbon radicals containing about 10 to 30 carbon atoms, with ethylene oxide, such as the condensation product of octadecyl alcohol with 25 to 30 mols of ethylene oxide, or a condensation product of commercial oleylamine with 15 mols of ethylene oxide, or a condensation product of dodecyl-mercaptan with 12 mols of ethylene oxide. Among anion-active emulsifying agents, that may be used, there may be mentioned the sodium salt of dodecyl alcohol sulfuric acid ester, the sodium salt of dodecyl-benzene-sulfonic acid, the potassium or tri-ethanolamine salt of oleic acid or of abietic acid, or mixtures of these acids, or the sodium salt of a petroleum sulfonic acid. As cation-active emulsifying agents there may be mentioned quaternary ammonium compounds, such as cetyl-pyridinium bromide or dihydroxybenzyl-dodecyl-ammonium chloride. For making dusting or scattering preparations there may be used as carriers talcum, kaolin, bentonite, calcium carbonate or calcium phosphate, or carbon, cork meal or wood meal, and other materials of vegetable origin. It is very advantageous to make up the preparations in a granular form. The various preparations can be rendered more suitable for the methods in which they are to be used by the known addition of substances which improve the dispersion, adhesiveness, resistance to rain or penetration capacity of the compositions. As such substances there may be mentioned fatty acids, resins, glue, casein or, for example, alginates or the like.

The herbicidal preparations of this invention are suitable for the selective destruction of weeds under crop plants and also for the total killing and destruction of undesired plant growth. The term "weeds" is used in this connection to include undesired plants, that is to say, plants previously planted or growing in the vicinity.

The following examples illustrate the invention:

*Example 1*

443 grams of 3-trifluoromethyl-4-chlorophenyl isocyanate, dissolved in 200 cc. of acetone, are added slowly to 270 cc. of an aqueous dimethylamine solution of 40% strength in 1500 cc. of water while stirring vigorously. With a slight increase in temperature to 40° C., the condensation to give N-3-trifluoromethyl-4-chlorophenyl-N':N'-dimethyl urea takes place, this being immediately precipitated in a technically pure state. After stirring for six hours, a little water is added and the urea is filtered off with suction, washed with water and a little dilute acetic acid and dried in vacuo at 60° C. Crude yield: 516.0 grams; melting point: 137 to 138° C. A test sample recrystallized from alcohol shows a melting point of 139 to 140° C.

$C_{10}H_{10}ON_2ClF_3$:
Calculated: N, 10.5%; Cl, 13.3%.
Found: N, 10.18%; Cl, 13.03%.

Prepared under the same conditions, N-3-trifluoromethyl-4-chlorophenyl-N'-methyl-N'-n-butyl urea appears as oil which boils at 0.01 mm. between 170 and 180° C. Solidification point: 54.5 to 55.5° C. Condensed with monomethylamine, 3-trifluoromethyl-4-chlorophenyl isocyanate gives under the same conditions N-3-trifluoromethyl-4-chlorophenyl-N'-methyl urea having a melting point of 130 to 131° C.

$C_9H_9ON_2ClF_3$:
Calculated: N, 11.09%; Cl, 14.04%.
Found: N, 11.18%; Cl, 13.65%.

*Example 2*

22 grams of 2-chloro-5-trifluoromethylphenylisocyanate are dissolved in 25 cc. of acetonitrile and added drop by drop to an aqueous dimethylamine solution of 40% strength. The temperature slowly increases to 46° C. During this process the urea is precipitated in semi-solid form. Stirring is continued for some hours, the product solidifying. The product is filtered off, washed with water and dried in the air. The crude yield is 25 grams. Recrystallized from alcohol and water, the product shows a melting point of from 98 to 99° C.

$C_{10}H_{10}ON_2ClF_3$:
Calculated: N, 10.5%.
Found: N, 10.53%.

In the same way as that described in Examples 1 and 2, the following urea derivatives can also be prepared.

(a)

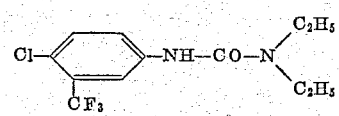

(Melting point 116 to 117° C.)
N-3-trifluoromethyl-4-chlorophenyl-N':N'-diethyl urea (b)

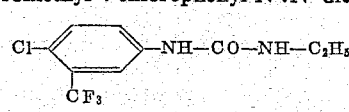

(Melting point 129 to 130° C.)
N-3-trifluoromethyl-4-chlorophenyl-N'-ethyl urea (c) 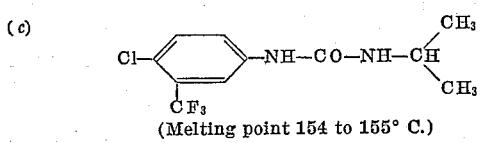
(Melting point 154 to 155° C.)
N-3-trifluoromethyl-4-chlorophenyl-N'-isopropyl urea (d) 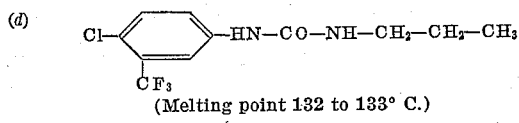
(Melting point 132 to 133° C.)
N-3-trifluoromethyl-4-chlorophenyl-N'-n-propyl urea

Example 3

210 grams of 3-trifluoromethyl-4-chlorophenyl isothiocyanate (distilled under 11 mm. of pressure at 119–120° C.; under 0.04 mm. at 70–73° C.), dissolved in 200 cc. of acetone, are added drop by drop to 1 liter of water and 130 cc. of aqueous dimethylamine solution of 40% strength while stirring. N-3-trifluoromethyl-4-chlorophenyl-N':N'-dimethyl thiourea is precipitated in the process. This is filtered off, washed with water and a little dilute acetic acid and dried in vacuo at 60° C. The crude yield is 244 grams. The crude condensation product has a melting point of 157–158° C. Recrystallized from alcohol, the compound melts at 159–160° C.

$C_{10}H_{10}N_2ClF_3S$:
Calculated: N, 9.91%; Cl, 12.54%; S, 11.35%.
Found: N, 10.12%; Cl, 12.60%; S, 11.45%.

Example 4

20 parts of N-3-trifluoromethyl-4-chlorophenyl-N':N'-dimethyl urea and 80 parts of talc are ground very finely in a ball mill. The mixture so obtained is used as a dusting agent.

Example 5

20 parts of N-3-trifluoromethyl-4-chlorophenyl-N':N'-dimethyl urea are dissolved in a mixture of 48 parts of diacetone alcohol, 16.5 parts of xylene and 16 parts of a condensation product of ethylene oxide with higher fatty acids, for example the condensation product of soybean fatty acid and 30 mols of ethylene oxide. This concentrate may be diluted with water to give emulsions of any desired concentration. It is also possible to employ N-3-trifluoromethyl-4-chlorophenyl-N'-methyl urea.

Example 6

80 parts of N-3-trifluoromethyl-4-chlorophenyl-N':N'-dimethyl urea or equal parts of N-3-trifluoromethyl-4-chlorophenyl-N'-methyl urea are mixed with 4 parts of a wetting agent, for example the sodium salt of butylnaphthalenesulfonic acid, 1 to 3 parts of a protective colloid, for example sulfite waste liquor, and 15 parts of a solid inert carrier such as kaolin, chalk or kieselguhr and thereupon finely ground. The wettable powder obtained may be mixed with water before use and gives a suspension which is ready for use.

Example 7

15 parts of N-3-trifluoromethyl-6-chlorophenyl-N':N'-dimethyl urea are dissolved in 90 parts of coal-tar oil, diesel oil or spindle oil.

Example 8

N-3-trifluoromethyl-4-chlorophenyl - N':N' - dimethyl urea, applied in a quantity of 10–20 kg. in 1000 liters/hectare, destroys within a few weeks all the weeds in a farmyard infested with weeds.

Example 9

To 10 grams of compounds (a), (b), (c) and (d) there are added separately in each case 2 grams of waste sulfite pulp liquor and 100 cc. of water and the mixture is thereafter subjected to intensive grinding, whereby finely divided, stable dispersions are obtained.

The compounds (a), (b), (c) and (d) correspond to the following formulae

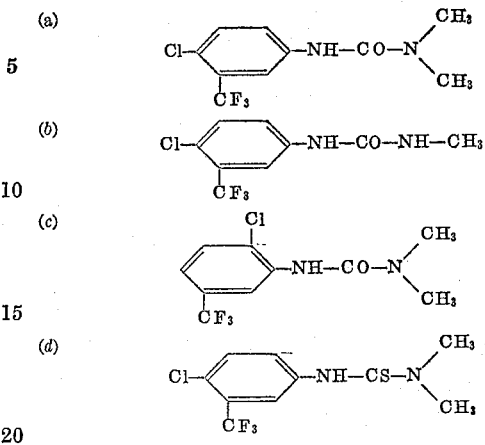

Example 10

80 parts of compounds (a) and (b) are mixed with 16 parts of kaolin and 4 parts of an emulsifier supplied by Ninol Inc., Chicago, under the trade mark "Toximul MP" and finely ground. The mixtures can be used as spraying powders.

Example 11

Flower pots are filled with earth in a greenhouse and sown with seeds of the weeds and cultivated plants named hereunder: Zea mays, Avena sativa, Setaria italica, Dactylis glomerata, Sinapis alba, Lepidium sativum, Calendula chrysantha. The earth is watered and treated on the day of sowing with spraying liquids prepared from the dispersions obtained according to Example 9. For each active substance, the quantity employed is 10 kg. per hectare, 4 weeks after treatment all the test plants die off, with the exception of Zea mays, which is more or less heavily damaged.

Example 12

Flowerpots are prepared as in Example 11. 10–14 days after sowing, the plants are sprayed with a spraying liquid obtained from the dispersions according to Example 9, the quantity of each active substance employed corresponding to 10 kg. per hectare. As the absorption of the active substance also takes place through the leaves, the treated plants, with the exception of Zea mays, already die off completely or almost completely after 14 days.

Example 13

A field which has been freed before the commencement of the test from all annual weeds, is sown with the following weeds and cultivated plants:
Zea mays, Triticum vulgare, Avena sativa, Setaria italica, Sorghum sudanense, Allium cepa, Cannabis sativa, Brassica rapa, Sinapis alba, Raphanus raphanistrum, Linum usitatissimum, Soja max, Trifolium pratense, Trifolium repens, Pisum sativum, Beta vulgaris, Phaseolus vulgaris, Daucus carota, Spinacia oleracea, Lactuca sativa. On the day of sowing, the field is treated with a dispersion of compounds (a) and (b) prepared as described in Example 10, the quantity employed corresponding to 1.25 to 5 kg. of active substance per hectare. 30 days after treatment, all the test plants, with the exception of Zea mays and Pisum sativum, which are only partially destroyed, have died off completely or almost in the field which has been treated with 1.25 kg. of compound (a). The same effect is obtained with 5 kg. of compound (b). The same applies to the following weeds which have come up on the test field:
Lamium purpureum, Chenopodium album, Capsella bursa pastoris, Galeopsis tetrahit, Senecio vulgaris, Polygonum aviculare, Polygonum convolvulus, Raphanus raphanistrum, Chrysanthemum leucanthemum, Ranunculus repens.

*Example 14*

A field is prepared and sown as in Example 13. 4 weeks after sowing treatment is carried out with the compounds (a) and (b) formulated as described in Example 10, the quantity employed corresponding to 5 kg. of active substance per hectare. 3 weeks after treatment, all the test plants, with the exception of *Zea mays*, which is only damaged by compound (b), have died off completely or almost completely.

What is claimed is:

1. A carbamic acid derivative of the formula

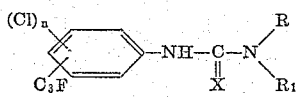

in which R represents a lower alkyl group, $R_1$ represents a member selected from the group consisting of hydrogen and a lower alkyl group, X represents a member selected from the group consisting of oxygen and sulfur and $n$ is a whole number of at most 2.

2. N - 3 - trifluoromethyl - 4 - chlorophenyl - N':N'-dimethyl-urea.

3. N - 3 - trifluoromethyl - 4 - chlorophenyl - N'-methyl-urea.

4. N - 3 - trifluoromethyl - 4 - chlorophenyl - N-methyl-N'-n-butyl-urea.

5. N - 3 - trifluoromethyl - 6 - chlorophenyl - N':N'-dimethyl-urea.

6. N - 3 - trifluoromethyl - 4 - chlorophenyl - N':N'-diethyl-urea.

7. N-3-trifluoromethyl-4-chlorophenyl-N'-ethyl-urea.

8. N - 3 - trifluoromethyl - 4 - chlorophenyl - N' - isopropyl-urea.

9. N - 3 - trifluoromethyl - 4 - chlorophenyl - N' - n-propyl-urea.

10. N - 3 trifluoromethyl - 4 - chlorophenyl - N':N'-dimethyl-thiourea.

References Cited by the Examiner
UNITED STATES PATENTS 2,723,192  11/55  Todd _____ 260—553
2,726,150  12/55  Wolter _____ 260—553

OTHER REFERENCES

Abel: Chemistry and Industry (July–September 1957), pages 1106–12 at pp. 1109–10.

NICHOLAS S. RIZZO, *Primary Examiner.*

H. J. LIDOFF, IRVING MARCUS, *Examiners.*